US009329727B2

(12) United States Patent
Wang et al.

(10) Patent No.: US 9,329,727 B2
(45) Date of Patent: May 3, 2016

(54) OBJECT DETECTION IN OPTICAL SENSOR SYSTEMS (71) Applicant: Microsoft Technology Licensing, LLC, Redmond, WA (US)

(72) Inventors: Liang Wang, Sammamish, WA (US); Sing Bing Kang, Redmond, WA (US); Jamie Daniel Joseph Shotton, Cambridge (GB); Matheen Siddiqui, Los Angeles, CA (US); Vivek Pradeep, Snohomish, WA (US); Steven Nabil Bathiche, Kirkland, WA (US); Luis E. Cabrera-Cordon, Bothell, WA (US); Pablo Sala, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 187 days.

(21) Appl. No.: 14/103,499

(22) Filed: Dec. 11, 2013

(65) Prior Publication Data

US 2015/0160785 A1 Jun. 11, 2015

(51) Int. Cl.
*G06F 3/041* (2006.01)
*G06F 3/042* (2006.01)
*G06F 17/18* (2006.01)
*G06K 9/00* (2006.01)
(Continued)

(52) U.S. Cl.
CPC .............. *G06F 3/0421* (2013.01); *G06F 3/042* (2013.01); *G06F 3/0412* (2013.01); *G06F 3/0416* (2013.01); *G06F 17/18* (2013.01); *G06K 9/00389* (2013.01); *G06K 9/2018* (2013.01); *G06K 9/4628* (2013.01); *G06K 9/6282* (2013.01)

(58) Field of Classification Search
CPC ..... G06F 3/0425; G06F 3/0428; G06F 3/011; G06F 3/0304; G06F 2203/04101; G06F 3/042; G06F 3/017; G06F 3/0416; G06F 3/0421; G06F 17/18; G06F 2203/04109; G06F 3/005; G06F 3/0412; G06F 3/0418; G06F 21/32; G06F 2203/04108
USPC .................. 345/156, 158, 166, 169, 173–181
See application file for complete search history.

(56) References Cited

U.S. PATENT DOCUMENTS 6,556,210 B1    4/2003  Yamamoto et al.
8,466,902 B2    6/2013  Boer et al.
(Continued)

FOREIGN PATENT DOCUMENTS

EP          1755022         2/2007
WO      WO-2012145496      10/2012
WO      WO-2013130920       9/2013

OTHER PUBLICATIONS

Ahsanullah, "Investigation of Fingertip Blobs on Optical Multi-Touch Screen System", In *International Symposium in Information Technology*, vol. 1, (Jun. 15, 2010), 6 pages.
(Continued)

*Primary Examiner* — Duc Dinh
(74) *Attorney, Agent, or Firm* — Brandon Roper; Judy Yee; Micky Minhas (57) ABSTRACT Object detection techniques for use in conjunction with optical sensors is described. In one or more implementations, a plurality of inputs are received, each of the inputs being received from a respective one of a plurality of optical sensors. Each of the plurality of inputs are classified using machine learning as to whether the inputs are indicative of detection of an object by a respective said optical sensor.

19 Claims, 9 Drawing Sheets (51) Int. Cl.
 *G06K 9/20* (2006.01)
 *G06K 9/46* (2006.01)
 *G06K 9/62* (2006.01)

(56) References Cited

U.S. PATENT DOCUMENTS

| | | | |
|---|---|---|---|
| 8,786,576 B2 * | 7/2014 | Jung et al. | 345/175 |
| 2006/0044282 A1 * | 3/2006 | Pinhanez et al. | 345/173 |
| 2008/0244468 A1 * | 10/2008 | Nishihara et al. | 715/863 |
| 2010/0201275 A1 | 8/2010 | Cok et al. | |
| 2011/0080490 A1 * | 4/2011 | Clarkson et al. | 348/222.1 |
| 2011/0122071 A1 | 5/2011 | Powell | |
| 2012/0057040 A1 | 3/2012 | Park et al. | |
| 2012/0113142 A1 | 5/2012 | Adhikari et al. | |
| 2012/0127128 A1 | 5/2012 | Large et al. | |
| 2012/0200532 A1 | 8/2012 | Powell et al. | |
| 2012/0319977 A1 | 12/2012 | Kuge | |
| 2013/0127704 A1 * | 5/2013 | Jung et al. | 345/156 |
| 2013/0156297 A1 * | 6/2013 | Shotton et al. | 382/159 |
| 2013/0201155 A1 | 8/2013 | Wu et al. | |
| 2013/0207937 A1 | 8/2013 | Lutian et al. | |
| 2013/0229357 A1 * | 9/2013 | Powell et al. | 345/173 |
| 2013/0241887 A1 * | 9/2013 | Sharma | 345/175 |
| 2014/0035805 A1 * | 2/2014 | Minnen et al. | 345/156 |
| 2015/0205445 A1 | 7/2015 | Pradeep et al. | |

OTHER PUBLICATIONS

Ewerling, Philipp "A Novel Processing Pipeline for Optical Multi-Touch Surface System", Available at <http://arxiv.org/pdf/1301.1551.pdf>, MSc Thesis,(Feb. 29, 2012), 86 pages.

Hodges, Steve et al., "ThinSight: Versatile Multi-touch Sensing for Thin Form-factor Displays", In *Proceedings of UIST 2007*, Available at <http://citeseerx.ist.psu.edu/viewdoc/download?doi=10.1.1.137.2342&rep=rep1&type=pdf>,(Oct. 10, 2007), 10 pages.

Soni, Vasuki et al., "An Interactive Infrared Sensor Based Multi-Touch Panel System", In *International Journal of Scientific and Research Publications*, vol. 3, Issue 3 (Mar. 2013), 12 pages.

Wilson, Andrew D., "TouchLight: An Imaging Touch Screen and Display for Gesture-Based Interaction", In *Proceedings of ICIM 2004*, Available at <http://citeseerx.ist.psu.edu/viewdoc/download?doi=10.1.1.95.3647&rep=rep1&type=pdf>,(Oct. 2004), 8 pages.

Yang, Duan-Duan et al., "An Effective Robust Fingertip Detection Method for Finger Writing Character Recognition System", In *Proceedings of the Fourth International Conference on Machine Learning and Cybernetics*, vol. 8, (Aug. 18, 2005), 6 pages.

International Search Report and Written Opinion, Application No. PCT/US2015/012328, May 11, 2015, 9 Pages.

Non-Final Office Action, U.S. Appl. No. 14/162,440, Aug. 4, 2015, 12 pages.

International Search Report and Written Opinion, Application No. PCT/US2014/068249, Mar. 16, 2015, 18 Pages.

Restriction Requirement, U.S. Appl. No. 14/162,440, May 13, 2015, 7 pages.

"Final Office Action", U.S. Appl. No. 14/162,440, Nov. 10, 2015, 14 pages.

"Second Written Opinion", Application No. PCT/US2015/012328, Dec. 23, 2015, 5 Pages.

* cited by examiner

OBJECT DETECTION IN OPTICAL SENSOR SYSTEMS

BACKGROUND

Computing devices may be configured to include touch functionality to detect proximity of an object to initiate one or more actions. For example, touch functionality may be utilized to detect proximity of a finger of a user's hand or other object to a display device as part of recognition of a gesture to initiate one or more functions of the computing device.

A variety of different types of sensors may be utilized to detect this proximity, one example of which includes use of optical sensors. The effectiveness of optical sensors is typically dependent on the environmental lighting conditions under which they operate. Accordingly, conventional use of the optical sensors in such environments could fail, thereby diminishing a user's experience and usefulness of the computing device as a whole, especially in situations in which the touch functionality is configured as a primary input technique for use with the computing device.

SUMMARY

Object detection techniques for use in conjunction with optical sensors is described. In one or more implementations, a plurality of inputs are received, each of the inputs being received from a respective one of a plurality of optical sensors. Each of the plurality of inputs are classified using machine learning as to whether the inputs are indicative of detection of an object by a respective optical sensor.

In one or more implementations, a system includes a plurality of optical sensors and one or more modules implemented at least partially in hardware. The one or more modules are configured to implement a first classifier, a second classifier, and an object candidate module. The first classifier is configured to generate a first probability map that describes a likelihood of detection of an object by respective ones of the plurality of optical sensors. The probability map is generated by taking as an input an image that includes both infrared light and ambient light and an image having ambient light subtracted from the infrared light. The second classifier is configured to generate a second probability map that describes a likelihood of detection of an object by respective ones of the plurality of optical sensors based at least in part on the input having the image that includes both infrared light and ambient light. The object candidate module is configured to determine whether an object has been detected using the first and second probability maps.

In one or more implementations, one or more computer readable storage media comprise instructions stored thereon that, responsive to execution by a computing device, causes the computing device to perform operations. The operations include generating a first probability map that describes a likelihood of detection of an object by respective ones of a plurality of optical sensors, the probability map generated by taking as an input an image that includes both infrared light and ambient light and an image having ambient light subtracted from the infrared light. The operations also include generating a second probability map that describes a likelihood of detection of an object by respective ones of the plurality of optical sensors based at least in part on the input having the image that includes both infrared light and ambient light. The operations further include determining whether an object has been detected using the first and second probability maps.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Accuracy in the conventional use of optical sensors for object detection is often dependent on lighting conditions of an environment in which the optical sensors are placed. For example, ambient lighting conditions may have an effect on a device's ability distinguish an object (e.g., a fingertip of a user's hand) from the device's surroundings.

Object detection techniques for optical sensor systems are described. Optical sensors may be configured in a variety of ways to detect proximity of an object, such as incorporated in a sensor-in-pixel design as part of a display device. Images collected from the sensors may then be processed to detect whether an object is proximal to respective ones of the sensors. A variety of different techniques may be employed to perform this processing. For example, machine learning techniques may be utilized to answer a question of "whether an object is detected" for each of a plurality of sensors, which may be expressed as a probability map. In another example, a plurality of classifiers may be utilized to perform the processing. A first classifier, for instance, may process an image that includes both infrared light and ambient light and an image having ambient light subtracted from the infrared light to generate a probability map. A second classifier may process the image that includes both infrared light and ambient light, solely, to generate another probability map. These maps may then be leveraged to detect a likelihood of whether an object is detected and also where that object is detected. This object detection may then be utilized to support a variety of different functionality, such as to recognize gestures, identify particular objects, and so on. Further discussion of these and other techniques may be found in relation to the following sections.

In the following discussion, an example environment is first described that is operable to employ the object detection techniques described herein. Example illustrations of the techniques and procedures are then described, which may be employed in the example environment as well as in other environments. Accordingly, the example environment is not limited to performing the example techniques and procedures. Likewise, the example techniques and procedures are not limited to implementation in the example environment.

Example Environment

Figure 1:
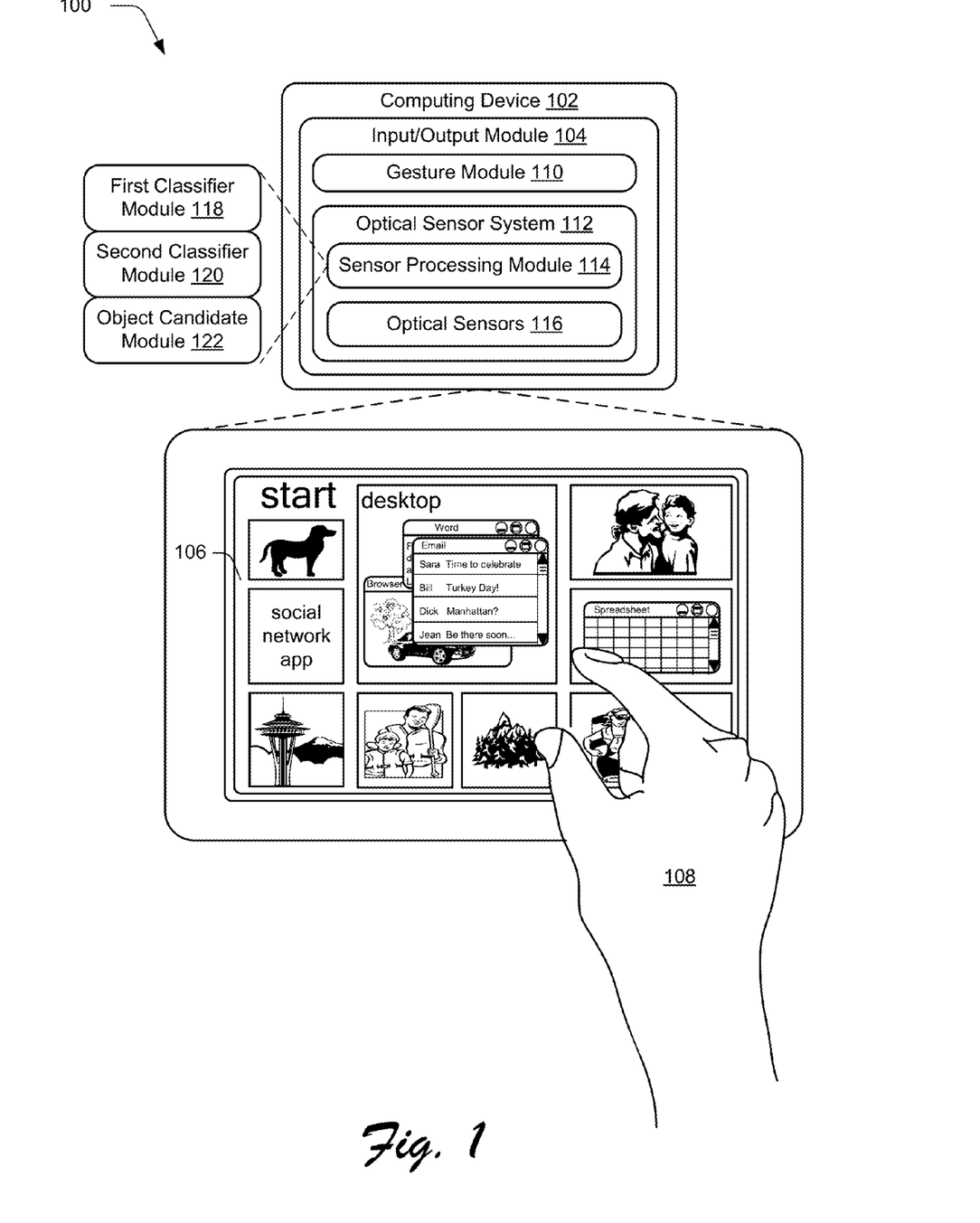
FIG. 1 is an illustration of an environment in an example implementation that is operable to employ object detection techniques for use in optical sensor systems.

FIG. 1 is an illustration of an environment 100 in an example implementation that is operable to employ object detection techniques for use in optical sensor systems. The illustrated environment 100 includes an example of a computing device 102 that may be configured in a variety of ways. For example, the computing device 102 may be configured as a traditional computer (e.g., a desktop personal computer, and so on), a mobile communications device (e.g., a tablet as illustrated, a mobile phone, portable game device, portable music device, or other mobile configuration configured to be held by one or more hands of a user), an entertainment appliance, a set-top box communicatively coupled to a television, a wireless phone, a netbook, a game console, and so forth as further described in relation to FIG. 9. Thus, the computing device 102 may range from full resource devices with substantial memory and processor resources (e.g., personal computers, game consoles) to a low-resource device with limited memory and/or processing resources (e.g., traditional set-top boxes, hand-held game consoles). The computing device 102 may also relate to software that causes the computing device 102 to perform one or more operations as well as refer to a combination of devices, e.g., a gesture capture device and game console, set-top box and remote control, and so on.

The computing device 102 is illustrated as including an input/output module 104. The input/output module 104 is representative of functionality relating to inputs of the computing device 102. For example, the input/output module 104 may be configured to receive inputs from a keyboard, mouse, to identify gestures and cause operations to be performed that correspond to the gestures, and so on. The inputs may be identified by the input/output module 104 in a variety of different ways.

For example, the input/output module 104 may be configured to recognize an input received via touchscreen functionality of a display device 106 to detect an object as proximal to the display device 106, such as a finger of a user's hand 108 as proximal to the display device 106 of the computing device 102, from a stylus, and so on. The input may take a variety of different forms, such as to recognize movement of a finger of the user's hand 108 across the display device 106, such as a tap, drawing of a line, and so on.

In implementations, these inputs may be recognized as gestures by a gesture module 110. A variety of different types of gestures may be recognized by the gesture module 110, such as gestures that are recognized from a single type of input (e.g., touch gestures) as well as gestures involving multiple types of inputs. For example, the computing device 102 may be configured to detect and differentiate between inputs based on which object is utilized to perform the gesture, e.g., a stylus or finger as described above. Additionally, although a touch input is described the recognition of the object as proximal to the display device 106 may be made without contacts the display device 106, e.g., as a "hover."

Additionally, although the following discussion may describe specific examples of inputs, in instances the types of inputs may be switched (e.g., touch may be used to replace stylus, a hover may be used in place of physical contact, and so forth) without departing from the spirit and scope thereof. Further, although in instances in the following discussion the gestures are illustrated as being input using touchscreen functionality, the gestures may be input using a variety of different techniques by a variety of different devices to detect proximity of an object.

One such example that may be utilized to detect proximity of an object is displayed as an optical sensor system 112. The optical sensor system 112 includes a sensor processing module 114 that is representative of functionality to make a determination for each of the optical sensors 116 as to whether an object is disposed proximal to the sensors.

The optical sensors 116, for instance, may be configured as part of the display device 106 as an array of sensors embedded with corresponding pixels to detect proximity of objects as a sensor-in-pixel (SIP) panel. For example, the optical sensors 116 may be configured as infrared sensors configured to detect infrared (IR) light to support an optical mode of interaction with the computing device 102. The optical sensors 116 in this IR configuration are embedded in the display device 106 to capture IR images of the surroundings of the display device 106 and even the computing device 102 as a whole, especially when objects are in contact with the display device, e.g., a user touches the screen.

Object detection by the optical sensors 116 and subsequent processing by the sensor processing module 114 allows the optical sensor system 112 system to map object position and motion into actions that may be recognized as gestures by the gesture module 110 and/or support other interaction, such as object identification and so on.

In the illustrated example, the sensor processing module 114 is illustrated as including first and second classifier modules 118, 120 and an object candidate module 122. The first and second classifier modules 118, 120 are representative of functionality to classify whether a likelihood that respective optical sensors 116 detect an object as proximal to the sensors, e.g., a finger of a user's hand 108. This may be performed in a variety of ways, such as to process images captured by the optical sensors 116 to generate probability maps as further described below. The probability maps may then be processed by an object candidate module 122 to determine whether an object has been detected using the probability maps. An example of a system 400 employing the first and second classifier modules 118, 120 and object candidate module 122 in greater detail is described in relation to FIG. 4.

Figure 2:
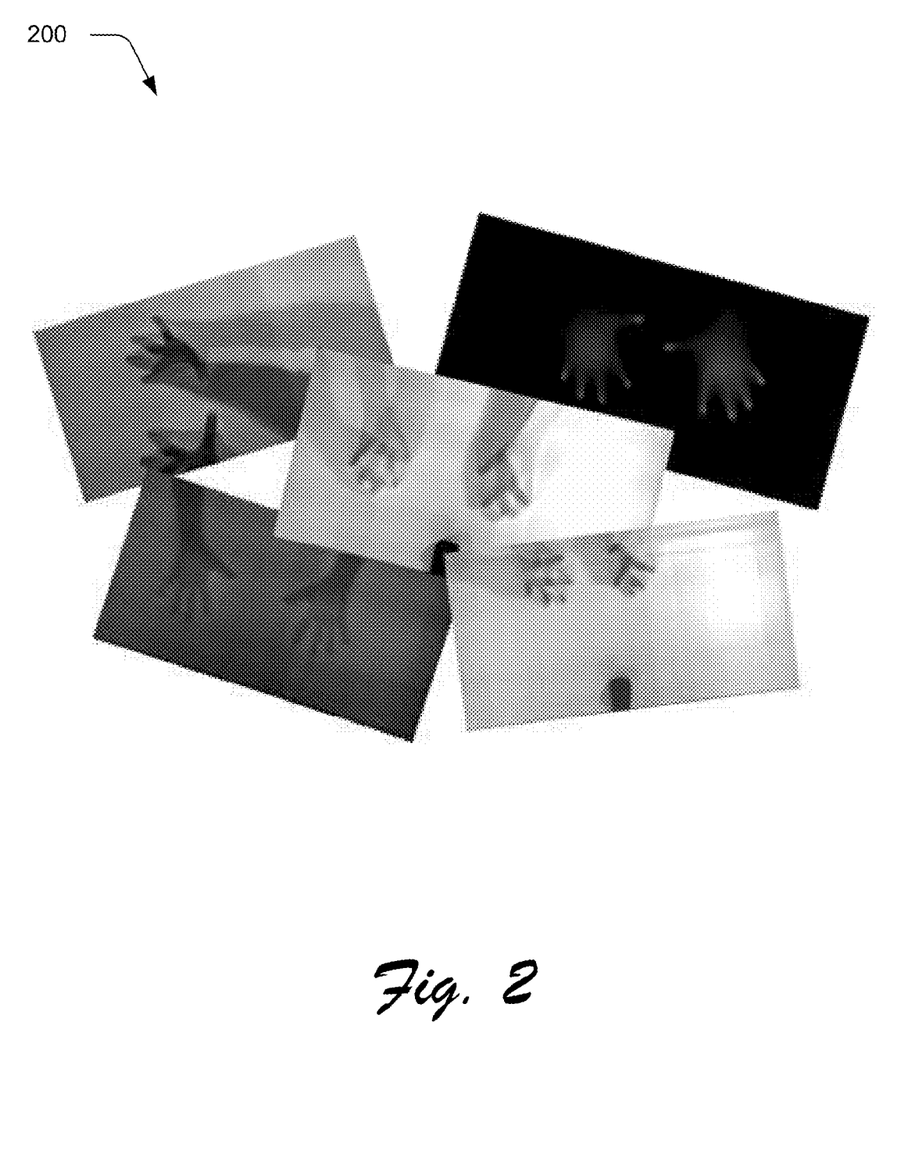
FIG. 2 illustrates an example showing images captured using the optical sensors of FIG. 1.

Conventional touch detection approaches assume that the infrared (IR) light is reflected back by fingers and forms a relatively bright spot in the SIP image captured by the sensors, with the background (non-finger region) being relatively dark. Therefore, these conventional approaches are based on local extrema in an intensity landscape captured by the sensors. In practice, however, the IR image may be strongly dependent on the ambient lighting condition in the environment. As shown in the example 200 of FIG. 2, the background can be bright and there may be shadows cast by the hand.

There are different types of images that may be directly read from the optical sensors 116. For example, a first type may involve an image with both IR light and ambient light. A second type is an image that includes solely ambient light. These two types of images are denoted using "Field_0" and "Field_1", respectively, in the following.

Figure 3:
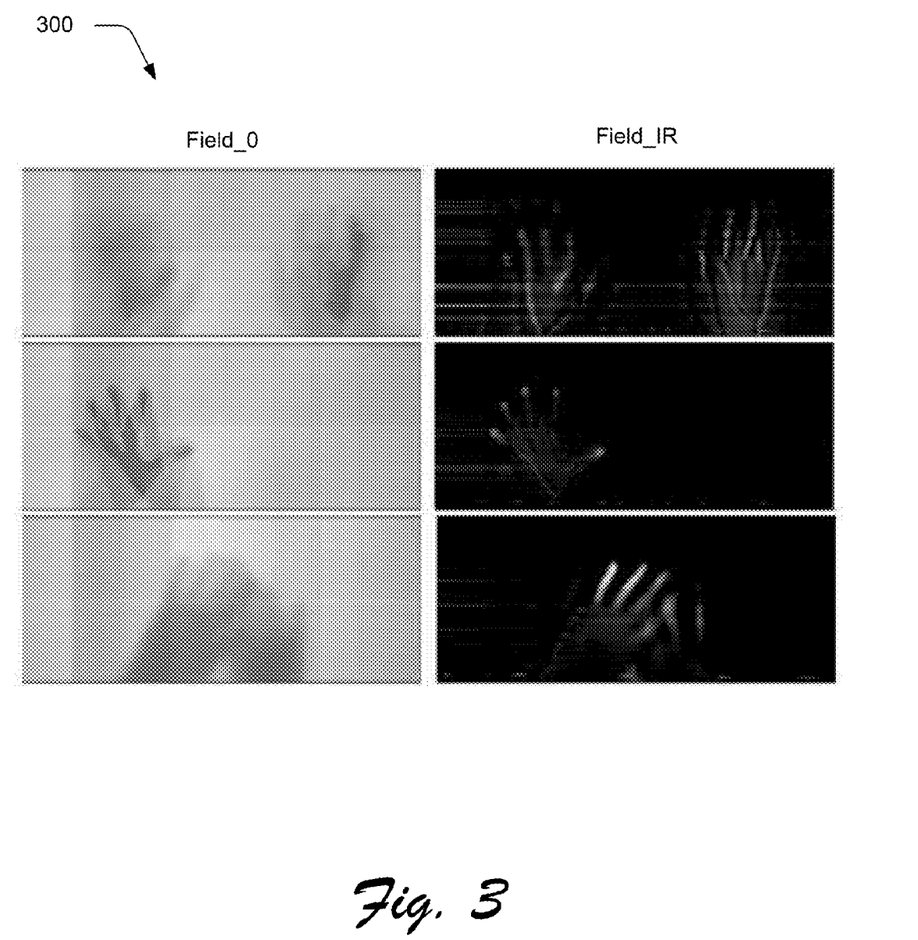
FIG. 3 illustrates an example showing images captured using the optical sensors of FIG. 1 and processed using a local extrema based approach.

In theory, subtraction of Field_1 from Field_0 may be performed to generate an IR component, which may be denoted as Field_IR in the rest of this discussion. This Field_IR image is (in theory) expected to be invariant to ambient lighting conditions. However, there are practical issues with this ambient cancelation technique. First of all, Field_0 and Field_1 are not taken at the same time. Therefore when an object moves, pixels near object boundaries could be bright in Field_IR which makes traditional local extrema based approach fail as shown in the example 300 shown in FIG. 3.

Second, the measured Field_0 and Field_1 images may be noisy both spatially and temporally. Such noises are content dependent and hence may be difficult to remove by conventional filtering methods. Further, pixel intensity values are not linear with respect to the sensor integration time and therefore ambient cancelation is not straightforward. Accordingly, motion artifacts, sensor noise, and optical sensor's nonlinear response make blob detection on Field_IR unreliable and lead to poor detection accuracy which is also shown in the example 300 of FIG. 3.

Accordingly, the optical sensor system 112 may be configured to employ machine learning classification techniques to robustly detect object locations that from inputs received from optical sensors 116 in real time under a wide variety of lighting conditions. Machine learning classifiers may be utilized to answer a per sensor (e.g., per sensor-in-pixel) question "Is this optical sensor detecting an object as proximal to the sensor?" A variety of different techniques may be utilized, such as Randomized Decision Forest (RDF) classifiers or other types of machines learning classifiers. In the following, techniques are described that include use of machine learning classifiers to classify pixels as detecting objects, use of multiple classifiers that are trained on different signals from the optical sensors 116 to increase detection accuracy, use of multiple types of classification split functions to increase detection accuracy, and use of split functions. Although touch inputs are described as an example in the following, it should be readily apparent that these inputs may also be detected without involving actual physical contact between an object (e.g., a finger of the user's hand 108) and a surface associated with the display device 106 or optical sensors 116.

In order to efficiently and robustly detect object locations by the optical sensors 116 under a range of lighting conditions, a machine learning discriminative classification is utilized in the following to answer the per optical sensor question as described above, namely: "Is this optical sensor detecting an object as proximal to the sensor?"

Given a set of classes "C={c1, c2, ..., ck}," a discriminative classifier may be employed by the sensor processing module 114 that is configured as an algorithm that for a given input "X," it returns a discrete probability distribution over the set of classes "C" conditional on the input "X." In the case of the problem involving the question above, the relevant set of classes for the following discussion are "Touch" and "No Touch", and the input to the used classifiers are sensor image patches around a pixel location. The classifiers are examined for each optical sensor 116 input, e.g., on each pixel in a sensor image captured by the optical sensors 116 and returns for each optical sensor 116 the probability of it being touched by (e.g., contacted with) a fingertip.

For example, RDF classifiers may be utilized by the sensor processing module 114 due to their efficiency and classification performance. RDF classifiers may be configured to leverage a collection of Randomized Decision Trees (RDT). The output of the RDF for a given input "X" may be computed by averaging the output of each of its RDTs for input X.

An RDT is a binary decision tree in which each internal (i.e., non-leaf) node has an associated "split" binary function, which when applied to an input, it returns a decision if the input is to be routed to the node's "right" or "left" child. Each leaf node in an RDT is associated with a discrete probability distribution over the set "C" of classes.

The classification process in an RDT for a given input "X" starts by processing "X" in the tree's root node by applying the root's associated split function. The processing of the input continues, recursively, on the child node corresponding to the split function's result. When the process reaches a leaf node, the probability distribution associated with such leaf node is returned as the output.

Figure 4:
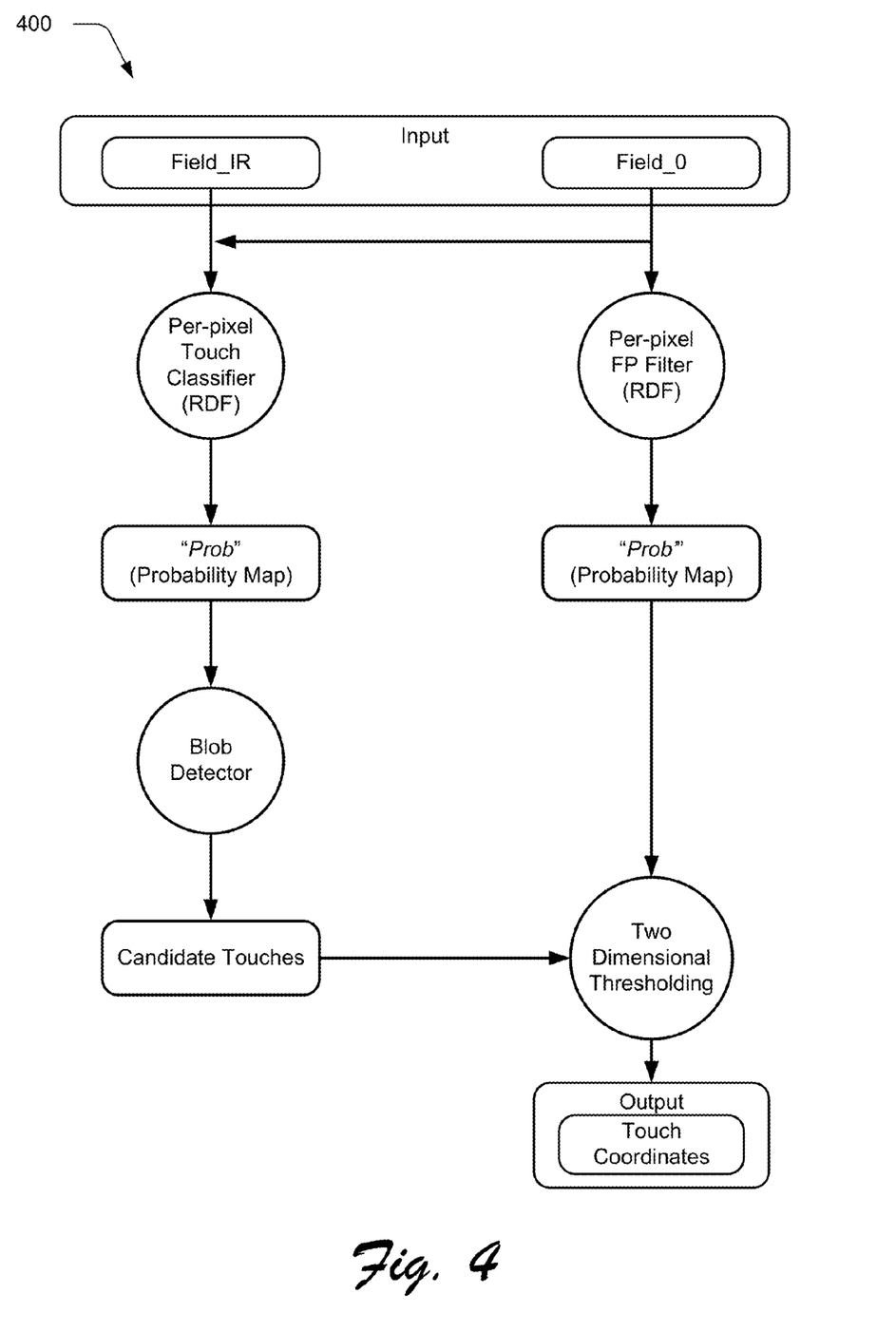
FIG. 4 illustrates an example system showing the optical sensor system of FIG. 1 in greater detail.

FIG. 4 depicts an example implementation of an overview of a system 400 that employs RDF classifiers. As illustrated, two RDF classifiers are used in this example. The first classifier takes as input Field_IR and Field_0 sensor images and outputs a dense touch probability map "Prob." Each pixel value in the probability map "Prob" indicates a probability of a corresponding optical sensor (e.g., sensor pixel) of being in contact with an object, e.g., a fingertip.

Figure 5:
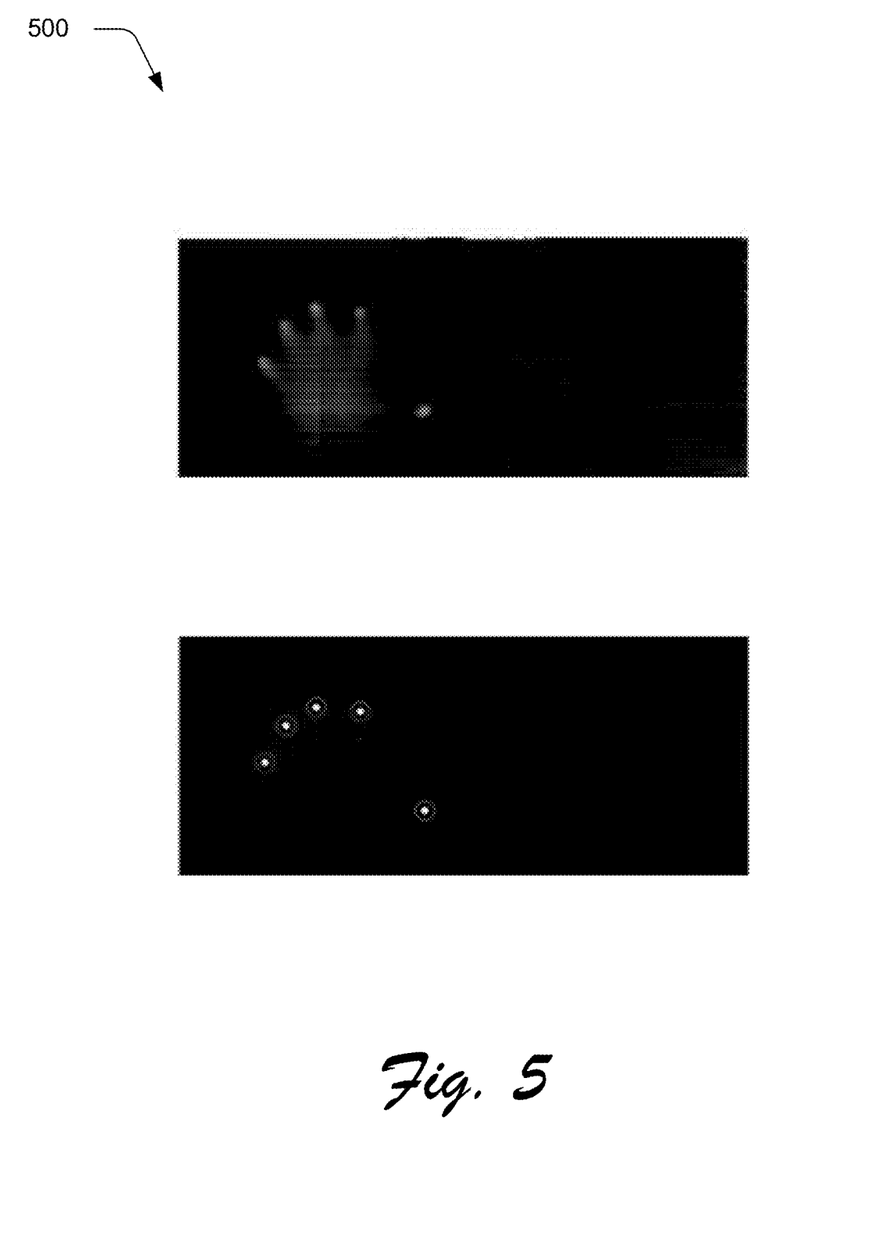
FIG. 5 depicts an example of a touch probability map.

As it can be seen in an example implementation 500 shown in FIG. 5, the touch probability map is not only cleaner than Field_IR but the appearance of a "touch region" (i.e., the fingertip-panel contact region) is more uniform as shown by a circularly symmetric bright blob in the figure. In general a touch region in "Prob" is easier to describe than that in Field_IR.

Returning again to the system 400 of FIG. 4, in a subsequent step, candidate touch locations are hypothesized at the centroids of blobs of high touch probability in "Prob" by a blob detection. For example, a "Difference of Gaussians" (DOG) based blob detector may be utilized to locate touch candidates. The probability map "Prob" may be convolved with a set of Gaussian filters at different blur scales as shown in an example 600 of a cascade filtering approach in FIG. 6.

Figure 6:
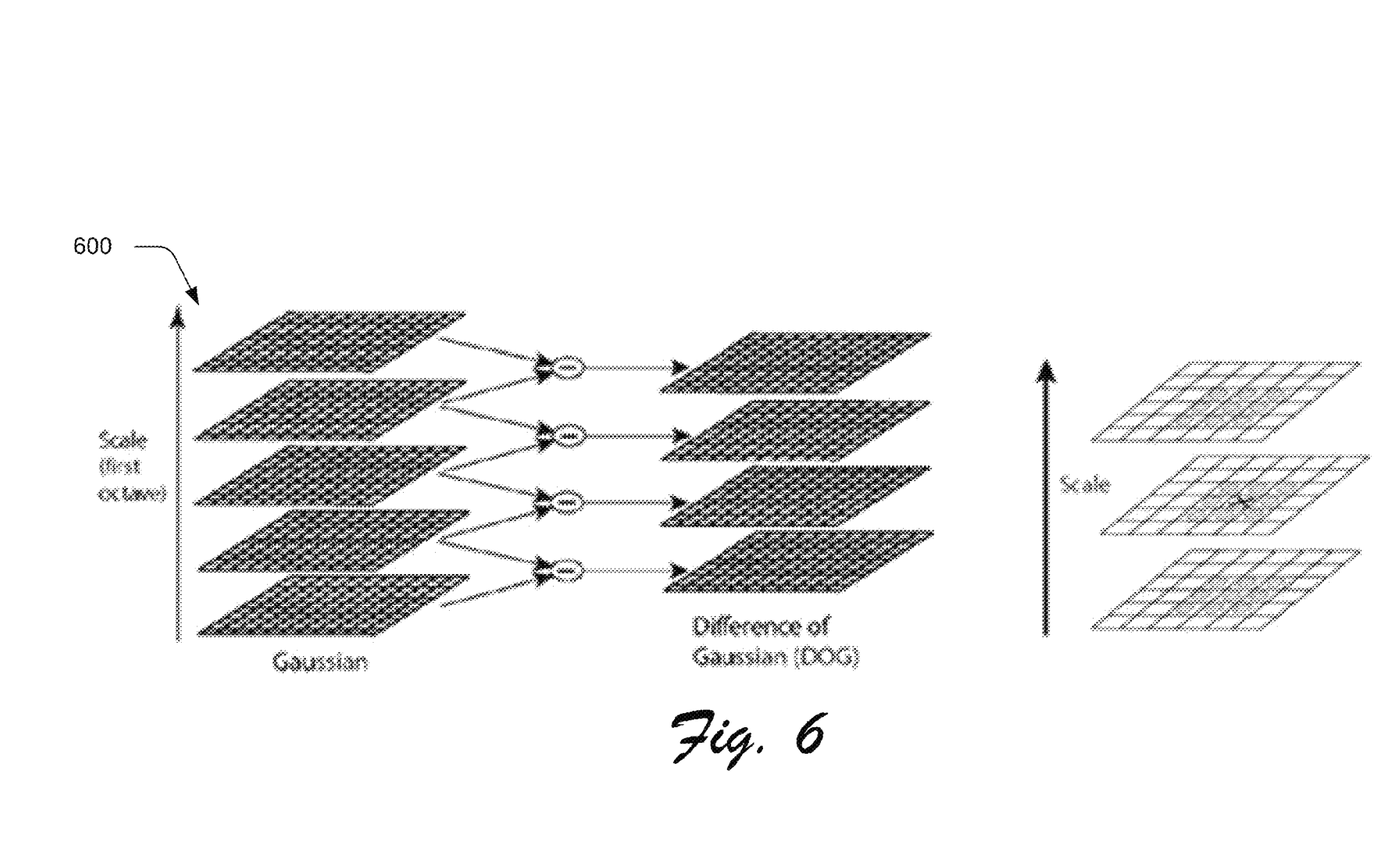
FIG. 6 depicts an example of a cascade filtering approach.

A DOG image at scale "$\sigma$" may be computed as follows:

$$D(x,y,\sigma)=(G(x,y,k\sigma)-G(x,y,\sigma)) \otimes \text{Prob}(x,y)$$

Then, pixels that are scale-space local maxima in "D(x,y,$\sigma$)" are detected as touch candidates.

In one or more implementations, each sample point is compared to its eight neighbors in the current image and nine neighbors in the scale above and below, respectively. It is selected if it is larger than each of these 26 neighbors as shown in the example 600 of FIG. 6. A blob contrast value of "D(x, y,$\sigma$)" of a touch candidate "(x,y)" is used. If the contrast is larger than a predefined threshold "T" (e.g., predefined by a user), pixel "(x,y)" is reported as a final touch. The detection accuracy largely depends on the threshold "T." For example, if "T" is too small, an increased number of true touches may be located but at the same a large number of false positives may be introduced into the detection results. On the other hand, if "T" is large, fewer false positives may be obtained at the cost of an increased number of false negatives.

A set of touch candidates, each being associated with a contrast value "D(x,y,$\sigma$)" is obtained as an output of the blob detection step. In order to better discriminate touch and non-touch image data, a second classifier trained just on Field_0 image data may be included in the system 400, which takes as input the list of touch location candidates returned by the blob detector. This second classifier may be tuned to improve the touch and non-touch data separation performance achieved by the first per-pixel touch classifier, which may be limited by ambiguities in its input signals. As can be observed in FIG. 3, for instance, although motion artifacts and noise can look very similar to actual touch signal in Field_IR, the appearance of touch and non-touch signals differ significantly in Field_0 imagery.

The output of the second classifier may be configured as a dense probability map "Prob", which may be smoothed by convolving it with a Gaussian filter with a kernel size slightly bigger than the average fingertip touch region's diameter.

Lastly, each touch candidate location "(x,y)" may be associated with a 2-dimensional measurement as follows:

$$DP(x,y)=(D(x,y,\sigma),\text{Prob}'(x,y))$$

This expression includes a corresponding touch probability "Prob'(x,y)" and contrast value "D(x,y,σ)" from the output of the blob detector. A touch candidate "(x,y)" is deemed to be an actual touch if the 2-D point "DP(x,y)" is above a predefined 2-D decision boundary. For example, the decision boundary may be configured as a particular gamma curve, whose parameter is chosen based on training data and a desired tradeoff between the FP and FN classification rates.

For example, it may be observed that in general a true touch has high contrast or high probability value. As such, touch probability "Prob'(x,y)" may act as a cue to reject false touches without a significant increase in the number of false negatives. Thus, classification using this 2-D decision boundary may be used to better discriminate between true and false touches than use of a single dimension decision boundary used along the contrast dimension from the output of the first classifier. Although use of two classifiers and a 2-D decision boundary is shown in the example system 400 of FIG. 4, this approach may be extended to additional dimensions, obtaining in the end a classification framework with higher classification accuracy.

Classifier Feature Functions

The classifiers use six different types of split functions. Let "I(x)" be the Intensity of pixel at 2-D location "$x \in \mathbb{N}^2$" on input field "I." Let "$\mathbb{H} \{-r, \ldots, -1, 0, 1, \ldots, r\}$" for a given "$r \in \mathbb{N}$". For the following discussion, let these expressions hold:

$$I_x((x,y)=I((x+1,y))-I((x-1,y))$$

$$I_y((x,y)=I((x,y+1))-I((x,y+1))$$

$$G(I,x)=\sqrt{I_x(x)^2+I_y(x)^2}$$

The split functions may then be expressed as follows:

1) Intensity Difference: $f_\theta^1(I, x) = I(x + u) - I(x + v)$, where $\theta = (u, v)$ and $u, v \in \mathbb{H}^2$.

2) Raw Intensity: $f_\theta^2(I, x) = I(x + u)$, where $\theta = (u)$, and $u \in \mathbb{H}^2$.

3) Focus: $f_\theta^3(I, x) = \max_{v=\{-1,1\}^2} |I(x + u + v) - I(x + u)|$, where $\theta = (u)$, and $u \in \mathbb{H}^2$.

4) Gradient Magnitude: $f_\theta^4(I, x) = \dfrac{G(I, x + u)}{\sqrt{2}}$, where $\theta = (u)$, and $u \in \mathbb{H}^2$.

5) Gradient Direction: $f_\theta^5(I, x) = \dfrac{\min(d\theta, 2\pi - d\theta)}{\pi}$, where $d\theta = \text{mod}\left(\left|\text{atan2}\left(\dfrac{I_y(x+u)}{G(Ix+u)}, \dfrac{I_x(x+u)}{G(I, x+u)}\right) - \rho\dfrac{2\pi}{16}\right|\right)$, $\theta = (u, \rho), u \in \mathbb{H}^2$, and $\rho \in [0 \ldots 15] \subset \mathbb{N}_0 /$ 6) Gradient Orientation Difference: $f_\theta^6(I, x) =$ $$\dfrac{\text{atan2}\left(\dfrac{I_y(x+u)}{G(Ix+u)}, \dfrac{I_x(x+u)}{G(I, x+u)}\right) - \text{atan2}\left(\dfrac{I_y(x+v)}{G(Ix+v)}, \dfrac{I_x(x+v)}{G(I, x+v)}\right) + 2\pi}{4\pi},$$

All six types of split functions may be used in the first classifier, while the second classifier may be limited to use of the Intensity Difference split function. Naturally, a variety of other examples are also contemplated without departing from the spirit and scope thereof.

Training the Classifiers

Data Collection

In order to train the classifiers, an offline ground-truth data collection stage may be utilized, in which a sufficiently large amount of video sequences of sensor imagery (i.e., Field_0, and Field_IR) are acquired for a variety of touch and non-touch events under a wide range of lighting conditions. To collect these positive (touch) and negative (non-touch) samples, the SIP panel or other arrangement of optical sensors 116 may be touched by fingers, employing different pressure, gestures and orientations. Naturally, other objects may also be utilized as well as samples that do not involve physical contact.

A second offline step of manual data labeling may also be utilized, in which the pixel at the center of each fingertip touch (i.e., the "touch location") is labeled for each of the touches in each collected image. A positive touch pixel sample may then be generated for each pixel inside a disk of small radius centered around each touch location. A fixed radius may be used which does not exceed the radius of the average touch region.

Negative training samples may be generated by randomly selecting pixels outside the touch regions. Each of the pixels in an annulus of small width around each touch location but with a radius slightly larger than the touch region are also labeled as negative samples.

RDF Training Procedure

In one or more implementations, the maximum height of an RDT may be set at a value of approximately twenty. An RDF classifier is trained by independently training each of its RDTs, one node at a time, starting from its root node. Each node is trained using an input training set. Initially, the entire training set is the input set used for training the root node.

Given an input training set "T" for a node "n," the node is trained by sampling a square root of "N" times the space of parameters of each type of split functions, where "N" is the cardinal of the split function's parameter space. This sampling is done for each input image, i.e., Field_IR or Field_0. Furthermore, for each sampled parameter, a number of possible threshold values is also sampled.

For a given split combination "Σ=(field, splitF,θ,τ)" of an input field "field", split function type "splitF" split function parameterization "θ," and threshold "τ", each input "x∈T" is split according to the value of "splitF$_\theta$(x)" being below or being above or equal threshold "τ".

Let "Σ" be the split combination that achieves a maximum information gain "IG" over the split of each of the elements in the node's input set "T" over each of the sampled split combinations. If "IG" is too small or if the node is at the maximum preselected height (e.g., twenty), then the node is set to be a leaf node and the touch probability associated with that leaf node is set to the ratio of the number of touch samples to the total number of samples in the node's input set "T." On the other hand, if "IG" is sufficiently high, the split combination "$\Sigma$" is associated to the node "n," the node's input set "T" is split into two subsets "$T_L$" and "$T_R$" using "$\Sigma$", and "n" is assigned two children nodes, each being recursively trained using input sets "$T_L$" and "$T_R$".

Datasets Used for Training Each Classifier

The first classifier "per-pixel Touch Classifier" in FIG. 4 may be trained on Field_0 and Field_IR imagery using each of the manually labeled positive and negative samples. After this classifier is trained, each of the false positive cases of the first classifier on the training data are collected. Specifically, the entire training data is run through the first classifier and the blob detector applied on each corresponding output probability map using a small contrast threshold "T," e.g., T=5. For a reported touch pixel, if it is not close enough to a ground truth touch location, it may be considered a case of a false positive.

The second classifier (i.e., per-pixel FP filter in FIG. 4) is trained on Field_0 imagery using each of the manually labeled positive samples but as negative samples. Each of the detected false positive cases of the first classifier on the training data are employed. Thus, the use of multiple input fields together with the six split functions to the first classifier may be observed to achieve a substantial improvement in performance with respect to using the Field_IR field and the Intensity Difference split function alone.

Example Procedures

The following discussion describes object detection techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-6.

Figure 7:
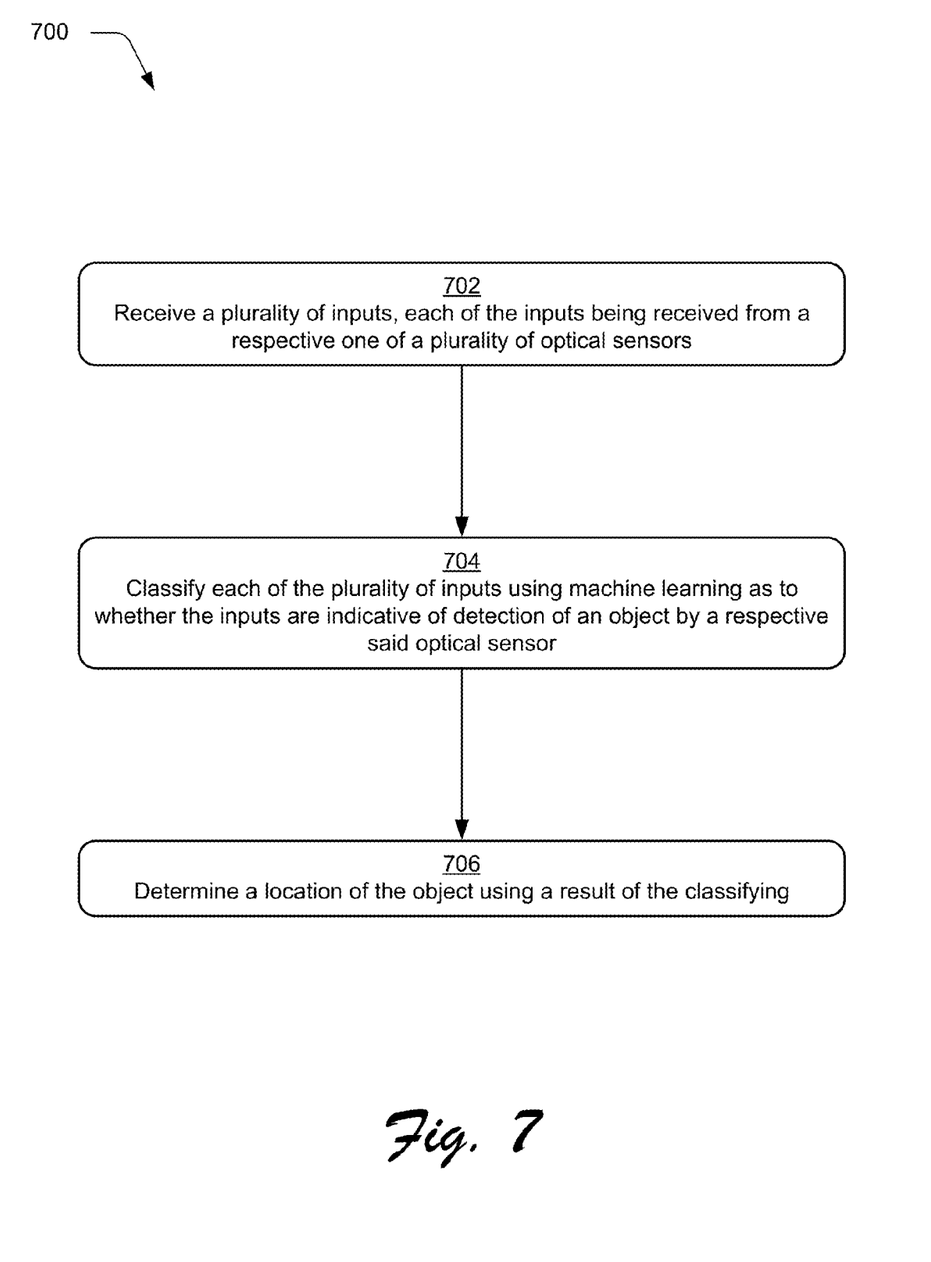
FIG. 7 is a flow diagram depicting a procedure in an example implementation in which input detected via optical sensors are classified using machine learning.

FIG. 7 depicts a procedure 700 in an example implementation in which input detected via optical sensors are classified using machine learning. A plurality of inputs are received, each of the inputs being received from a respective one of a plurality of optical sensors (block 702). The computing device 102, for instance, may include a plurality of optical sensors 116 arranged in an array as part of a sensor-in-pixel configuration of a display device 106.

Each of the plurality of inputs are classified using machine learning as to whether the inputs are indicative of detection of an object by a respective optical sensor (block 704). The sensor processing module 114 of the optical sensor system 112, for instance, may employ classifiers that perform machine learning to generate probability maps that describe relative likelihoods that corresponding optical sensors described in the maps detect proximity of an object.

A location is determined of the object using a result of the classifying (block 706). Continuing with the previous example, one or more locations of an object may then be detected from the probability maps, which may be leveraged to support a wide range of functionality. An example of such functionality is illustrated in FIG. 1 as a gesture module 110 that is configured to initiate operations of the computing device (e.g., by an operating system, applications, and so on) responsive to recognition of corresponding gestures. A variety of other examples are also contemplated, such as to identify a particular type of object (e.g., stylus versus touch), and so forth.

Figure 8:
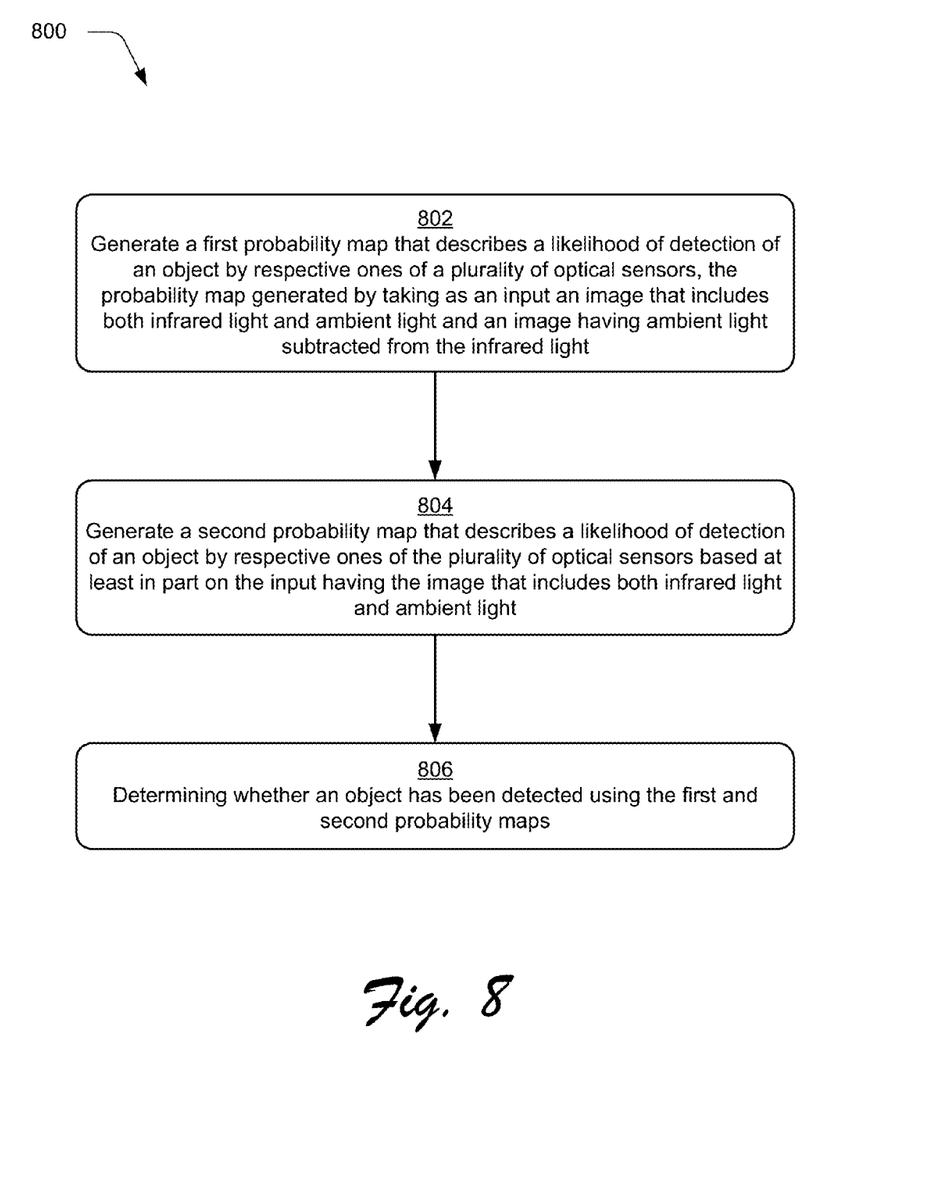
FIG. 8 is a flow diagram depicting a procedure in an example implementation in which classifiers are utilized to generate probability maps usable to determine whether an object is detected using a plurality of touch sensors.

FIG. 8 depicts a procedure 800 in an example implementation in which classifiers are utilized to generate probability maps usable to determine whether an object is detected using a plurality of touch sensors. A first probability map is generated that describes a likelihood of detection of an object by respective ones of the plurality of optical sensors. The probability map is generated by taking as an input an image that includes both infrared light and ambient light and an image having ambient light subtracted from the infrared light (block 802). As shown in FIG. 4, for instance, a first classifier module 118 of FIG. 1 may be implemented as a "per-pixel touch classifier (RDF)" that takes as an input a Field-IR image and a FIELD_0 image.

The second classifier is configured to generate a second probability map that describes a likelihood of detection of an object by respective ones of the plurality of optical sensors based at least in part on the input having the image that includes both infrared light and ambient light (block 804). Continuing with the previous example, a second classifier module 120 of FIG. 1 may be implemented as a "Per-pixel FP Filter (RDF)" that takes as an input a FIELD_0 image.

A determination is made as to whether an object has been detected using the first and second probability maps (block 806). The object candidate module 122 of FIG. 1, for instance, may be implemented as shown in FIG. 4 to support blob detection and two dimensional thresholds to form an output that includes coordinates of object if so detected. A variety of other examples are also contemplated as previously described.

Example System and Device

Figure 9:
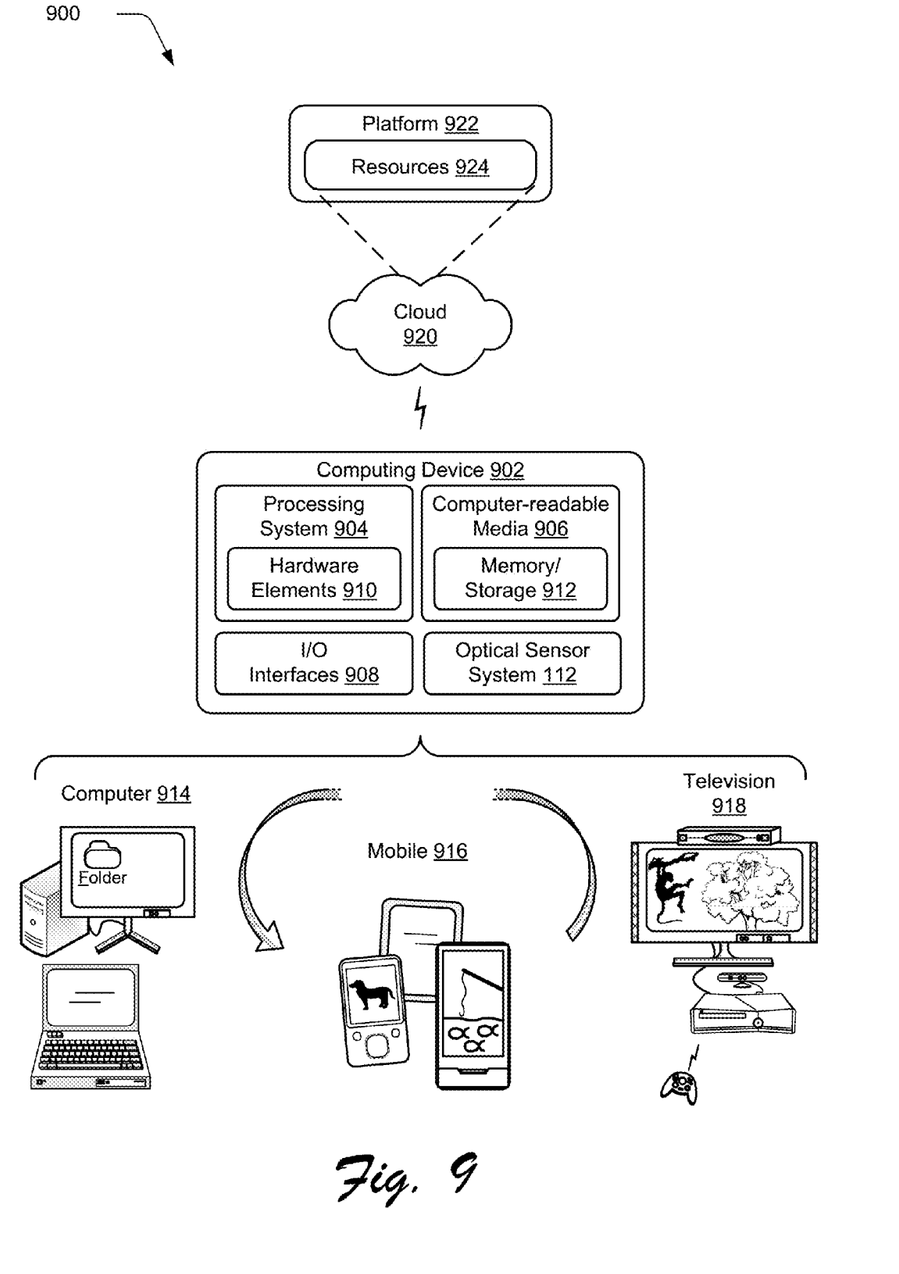
FIG. 9 illustrates various components of an example device that can be implemented as any type of portable and/or computer device as described with reference to FIGS. 1-8 to implement embodiments of the object detection techniques described herein.

FIG. 9 illustrates an example system generally at 900 that includes an example computing device 902 that is representative of one or more computing systems and/or devices that may implement the various techniques described herein. The computing device 902 may be, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interface 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware element 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 906 is illustrated as including memory/storage 912. The memory/storage 912 represents memory/storage capacity associated with one or more computer-readable media. The memory/storage component 912 may include volatile media (such as random access memory (RAM)) and/or nonvolatile media (such as read only memory (ROM), Flash memory, optical disks, magnetic disks, and so forth). The memory/storage component 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of a module that is executable by the computing device 902 as software may be achieved at least partially in hardware, e.g., through use of computer-readable storage media and/or hardware elements 910 of the processing system 904. The instructions and/or functions may be executable/operable by one or more articles of manufacture (for example, one or more computing devices 902 and/or processing systems 904) to implement techniques, modules, and examples described herein.

As further illustrated in FIG. 9, the example system 900 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 900, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 902 may assume a variety of different configurations, such as for computer 914, mobile 916, and television 918 uses. Each of these configurations includes devices that may have generally different constructs and capabilities, and thus the computing device 902 may be configured according to one or more of the different device classes. For instance, the computing device 902 may be implemented as the computer 914 class of a device that includes a personal computer, desktop computer, a multi-screen computer, laptop computer, netbook, and so on.

The computing device 902 may also be implemented as the mobile 916 class of device that includes mobile devices, such as a mobile phone, portable music player, portable gaming device, a tablet computer, a multi-screen computer, and so on. The computing device 902 may also be implemented as the television 918 class of device that includes devices having or connected to generally larger screens in casual viewing environments. These devices include televisions, set-top boxes, gaming consoles, and so on.

The techniques described herein may be supported by these various configurations of the computing device 902 and are not limited to the specific examples of the techniques described herein. This functionality may also be implemented all or in part through use of a distributed system, such as over a "cloud" 920 via a platform 922 as described below.

The cloud 920 includes and/or is representative of a platform 922 for resources 924. The platform 922 abstracts underlying functionality of hardware (e.g., servers) and software resources of the cloud 920. The resources 924 may include applications and/or data that can be utilized while computer processing is executed on servers that are remote from the computing device 902. Resources 924 can also include services provided over the Internet and/or through a subscriber network, such as a cellular or Wi-Fi network.

The platform 922 may abstract resources and functions to connect the computing device 902 with other computing devices. The platform 922 may also serve to abstract scaling of resources to provide a corresponding level of scale to encountered demand for the resources 924 that are implemented via the platform 922. Accordingly, in an interconnected device embodiment, implementation of functionality described herein may be distributed throughout the system 900. For example, the functionality may be implemented in part on the computing device 902 as well as via the platform 922 that abstracts the functionality of the cloud 920.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
receiving a plurality of inputs, each of the inputs being received from a respective one of a plurality of optical sensors;
classifying each of the plurality of inputs using machine learning as to whether the inputs are indicative of detection of an object by a respective said optical sensor, said classifying including:
using a first classifier to perform the classifying by taking as an input an image that includes both infrared light and ambient light and an image having ambient light subtracted from the infrared light and generating a probability map that describes of detection of the object by respective ones of the plurality of optical sensors; and
using a second classifier to perform the classifying based at least in part on the input having the image that includes both infrared light and ambient light; and
determining a location of the object using a result of the classifying.

2. A method as described in claim 1, further comprising recognizing a gesture usable to initiate an operation of the computing device based on a result of the determining.

3. A method as described in claim 1, wherein the input taken by the second said classifier is processed using one or more blob detection techniques.

4. A method as described in claim 1, wherein the plurality of optical sensors are arranged to form an array.

5. A method as described in claim 4, wherein the array is part of a sensor-in-pixel functionality of a display device of a computing device.

6. A method as described in claim 1, wherein the classifying includes use of a discriminative classifier that returns a result as a discrete probability distribution of a set of classes that are indicative of the detection of the object.

7. A method as described in claim 1, wherein the classifying includes classifying the inputs using a randomized decision forest (RDF) that employs one or more randomized decision trees (RDT).

8. A system comprising:
a plurality of optical sensors;
one or more hardware processors; and
one or more computer readable storage media storing instructions that are executable by the one or more hardware processors to perform operations including:
using a first classifier configured to generate a first probability map that describes a likelihood of detection of an object by respective ones of the plurality of optical sensors, the probability map generated by taking as an input an image that includes both infrared light and ambient light and an image having ambient light subtracted from the infrared light;
using a second classifier configured to generate a second probability map that describes a likelihood of detection of an object by respective ones of the plurality of optical sensors based at least in part on the input having the image that includes both infrared light and ambient light;
determining that an object has been detected using the first and second probability maps; and
determining a location of the object based on the first and second probability maps.

9. A system as described in claim 8, wherein the second probability map is generated by the second classifier without using the image having ambient light subtracted from the infrared light that is used by the first classifier.

10. A system as described in claim 8, wherein the using the first classifier and the using the second classifier comprise using machine learning to generate the first probability map and the second probability map, respectively.

11. A system as described in claim 8, wherein the using the second classifier to generate the second probability map comprises using inputs received from the plurality of optical sensors that have been processed using one or more blob detection techniques.

12. A system as described in claim 8, wherein the plurality of optical sensors are arranged to form an array.

13. A system as described in claim 12, wherein the array is part of a sensor-in-pixel functionality of a display device of a computing device.

14. A system as described in claim 8, wherein the using the first classifier and the using the second classifier comprise using a randomized decision forest (RDF) that employs one or more randomized decision trees (RDT) to generate the first probability map and the second probability map, respectively.

15. One or more computer readable storage media comprising instructions stored thereon that, responsive to execution by a computing device, causes the computing device to perform operations comprising:
- generating a first probability map that describes a likelihood of detection of an object by respective ones of a plurality of optical sensors, the probability map generated by taking as an input an image that includes both infrared light and ambient light and an image having ambient light subtracted from the infrared light;
- generating a second probability map that describes a likelihood of detection of an object by respective ones of the plurality of optical sensors based at least in part on the input having the image that includes both infrared light and ambient light; and
- determining that an object has been detected and a location of the object using the first and second probability maps.

16. One or more computer readable storage media as described in claim 15, wherein the generating of the first and second probability maps is performed using a first and second randomized decision forest (RDF) that employs one or more randomized decision trees (RDT), respectively.

17. One or more computer readable storage media as described in claim 15, wherein the plurality of optical sensors are part of a sensor-in-pixel functionality of a display device of the computing device.

18. One or more computer readable storage media as described in claim 15, wherein the generating the first probability map comprises using a first classifier, and the generating the second probability map comprises using a second classifier.

19. One or more computer readable storage media as described in claim 15, wherein the generating the second probability map comprises processing the input using one or more blob detection techniques.

* * * * *